UNITED STATES PATENT OFFICE.

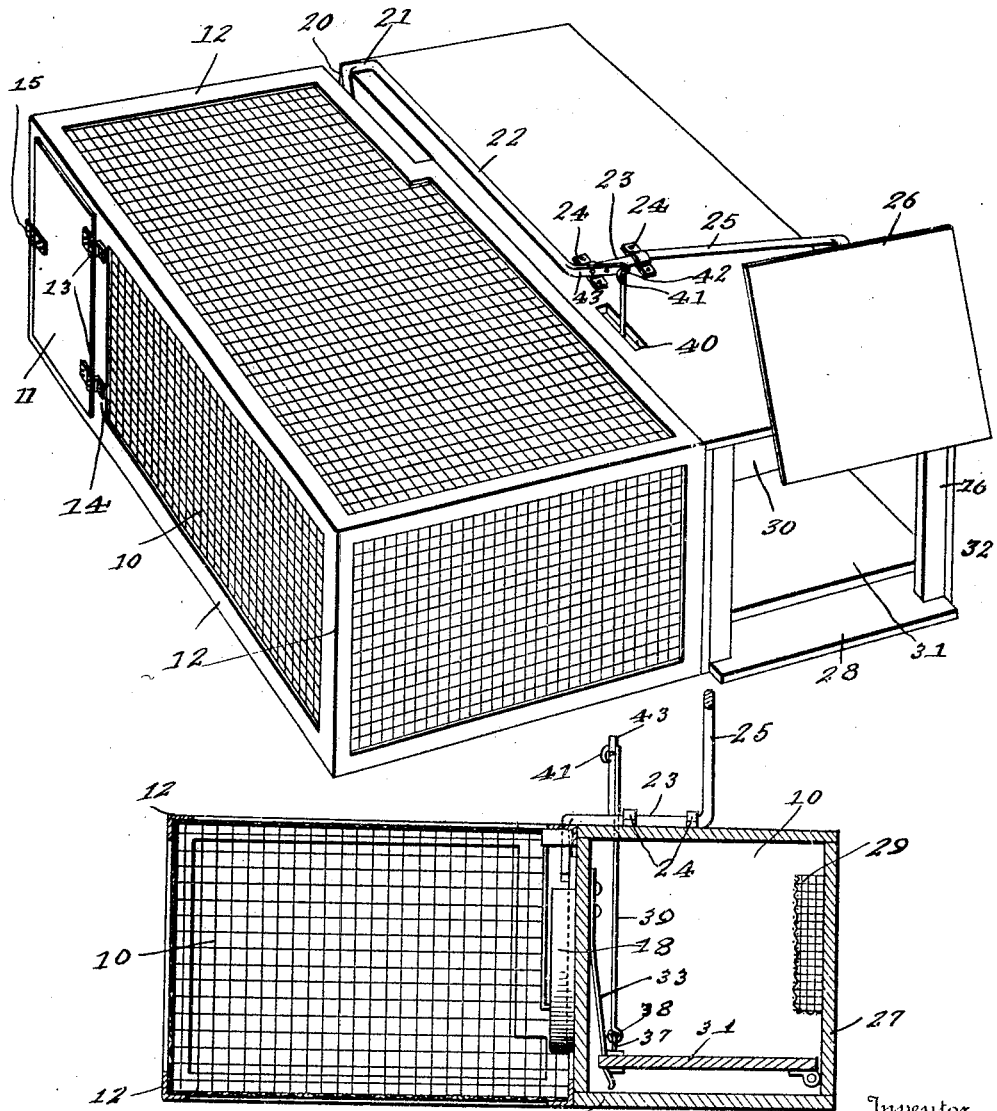

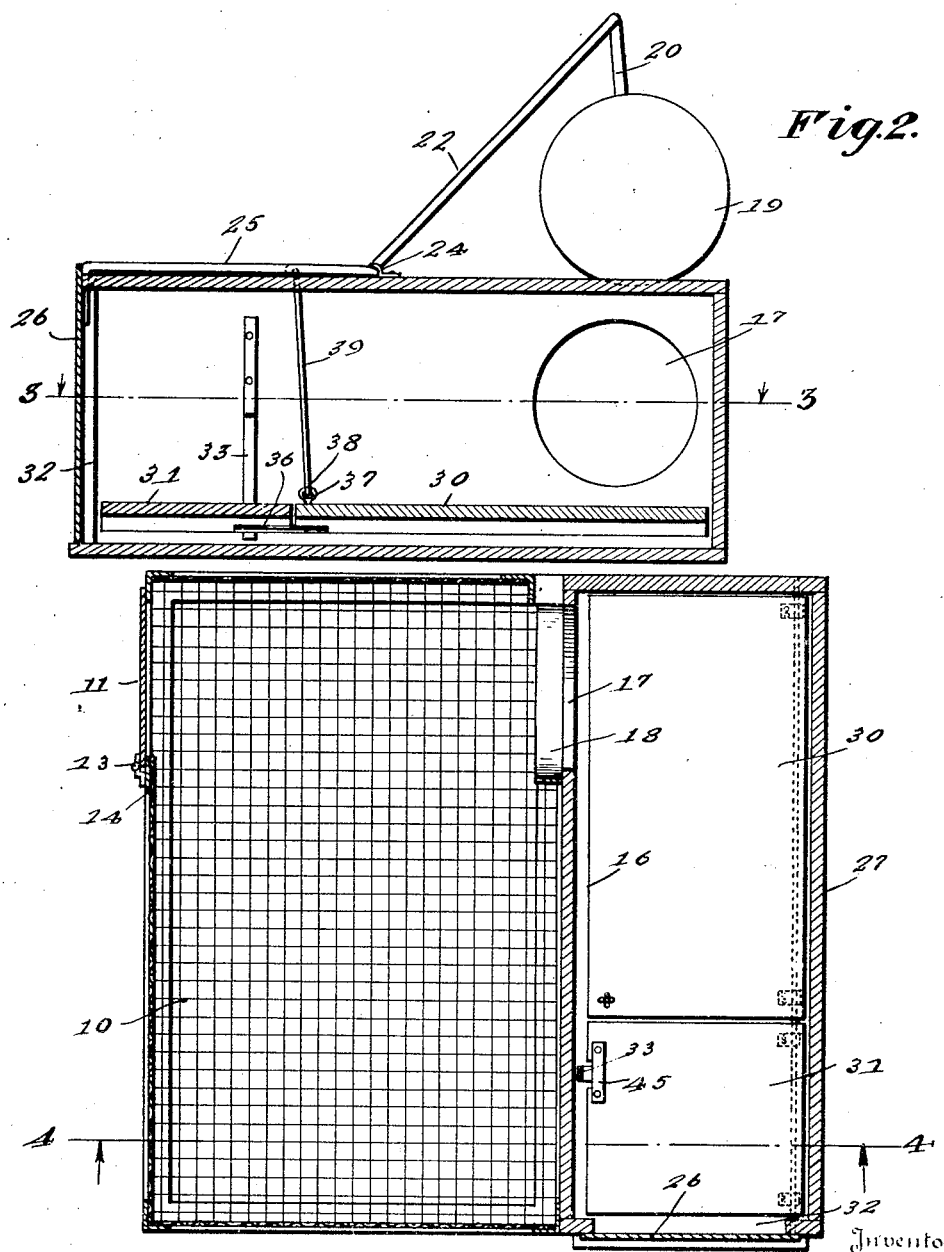

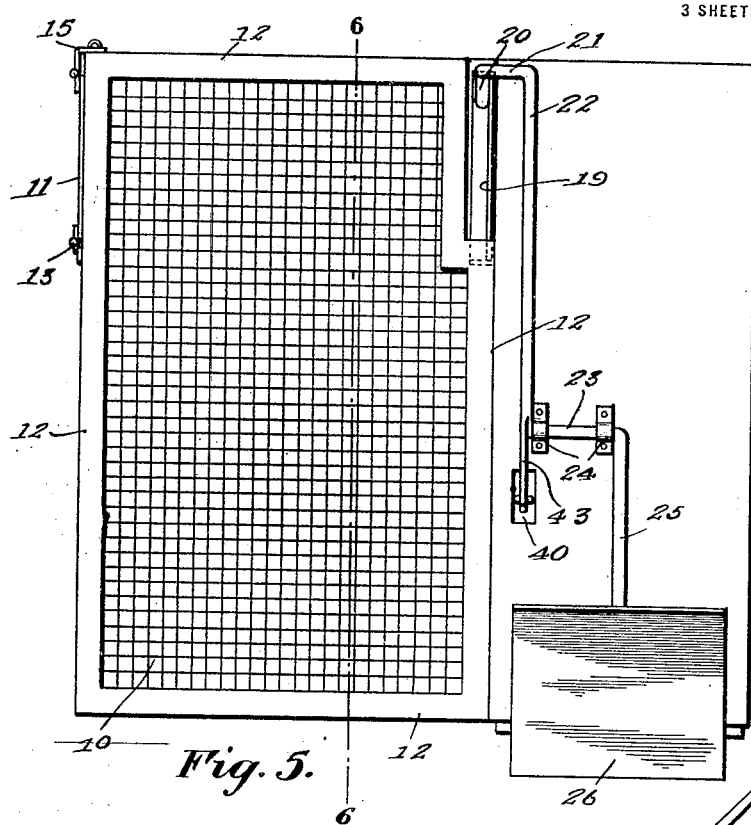
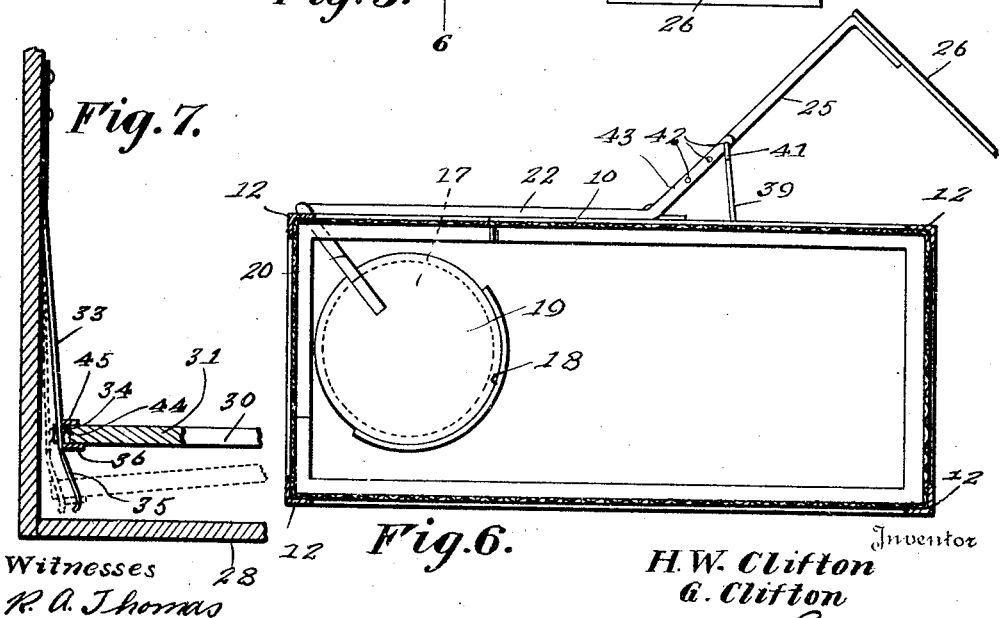

HARRY W. CLIFTON AND GEORGE CLIFTON, OF SALINA, KANSAS.

GAME-TRAP.

1,355,034.  Specification of Letters Patent.  Patented Oct. 5, 1920.

Application filed January 9, 1920. Serial No. 350,408.

*To all whom it may concern:*

Be it known that we, HARRY W. CLIFTON and GEORGE CLIFTON, citizens of the United States, residing at Salina, in the county of Saline and State of Kansas, have invented new and useful Improvements in Game-Traps, of which the following is a specification.

This invention has reference to improvements in animal traps.

An object of the invention is to produce a trap for catching animals without inflicting injury to such animals.

A further object of the invention is to produce a trap, including a cage proper and a box-like hallway or passage disposed to one side of the cage, the latter being provided with a door at its open end that has a connection with a swinging door that controls an opening between the passage and cage. In the passage is a bait box, and below the bait box are hinged platforms, means being provided for holding the outer platform stationary to permit of an animal fully entering the trap to obtain the bait which is disposed opposite the inner platform, mechanism being provided for simultaneously swinging both of the platforms in a downward direction when the weight of the animal is on the inner platform, and means being also provided for simultaneously swinging the doors whereby to close the door of the passage and to move the other door to uncover the opening so that the animal will pass from the passage through the opening into the cage, weighted means being provided for returning the parts to their initial position so as to retain the door between the passage and the cage normally closed and the door for the passage normally open.

It is a further object of the invention to produce an animal trap which shall be of a comparatively simple construction, cheaply constructed and thoroughly efficient for the purpose devised.

Other objects and advantages will present themselves as the nature of the invention is better understood, reference being had to the accompanying drawings, in which:

Figure 1 is a perspective view of the improvement.

Fig. 2 is a sectional view through the hall or passage, with the platforms depressed and the inlet door for the hallway or passage closed and the door controlling the opening between the passage or hallway and the cage proper open.

Fig. 3 is a horizontal sectional view approximately on the line 3—3 of Fig. 2 looking in the direction of the arrow and the parts being in their normal position.

Fig. 4 is a transverse sectional view approximately on the line 4—4 of Fig. 3.

Fig. 5 is a top plan view of the improvement.

Fig. 6 is a longitudinal sectional view approximately on the line 6—6 of Fig. 5.

Fig. 7 is a detail sectional view illustrating the manner in which the outer or supplementary platform is operated by the main platform when the weight of an animal is placed on the main platform after the said animal has passed over the auxiliary platform.

Before proceeding with the description of our improvement, it is to be understood that the same may be constructed for trapping either large or small animals, so that we do not limit ourselves to size, proportion and material employed.

The improvement contemplates the employment of a cage and a passage or hallway arranged to one side and connected to the cage. The cage is preferably constructed of reticulated material, wire mesh being illustrated in the drawings. The cage 10 is preferably, but not necessarily of rectangular box-like construction and is provided, upon its outer side with a door 11 that closes the outlet opening of the cage. The wire mesh which constitutes the body of the cage is preferably connected to angle metallic members at the ends and edges thereof, the said members being indicated by the numerals 12, and the door 11 is hingedly secured, as at 13 to a vertically disposed strip 14 that is connected to the upper and lower angle members 12 adjacent one end of the cage. The door abuts against one of the corner angle members 12 and is provided with suitable means 15 for retaining the same locked in closed position. The hallway or passage member for the animals is indicated by the numeral 16, and is preferably in the nature of a rectangular box-like structure that may be constructed of wood. One of the sides of the cage is open and this side is closed by one of the sides of the hall or passage 16, the latter being secured to the angle members 12 at the said open side of the cage. The inner side wall of the hallway or passage, preferably opposite the door 11 is provided with a round opening 17, and upon the outer face of the said side wall there is an outstanding metallic member 18 that is rounded to conform to the peripheral contour of the opening 17, the same being arranged outward of the said opening, and the said member 18 is in the nature of the segment of a circle. This member 18 provides a rest for a door 19 that normally closes the opening 17, the said door being in the nature of a flat peripherally rounded plate. Between the rear end of the cage and the rear end of the hall or passageway there is a slight opening at both the top and end of the trap to permit of the free movement of the door 19 and the rod 20 which is secured to the door. This rod 20 has its upper end provided with an angle portion 21 that rests on the closed top of the hall or passageway and which, in addition to the contacting engagement of the door with the segmental rest plate 18, limits the downward swinging of the door, or the movement of the door to a position for closing the opening 17. Formed on the end of the angle portion 21 of the rod 20 is an arm 22 that is arranged at a right angle with respect to the angle portion 21 and which extends longitudinally over the closed top of the hall or passageway. This arm 22, at the end thereof has an offset or cranked portion 23 which in reality provides the shaft for the arm, the said cranked portion or shaft being supported in suitable journal bearings 24 secured on the top of the hall or passageway. The end of the crank or shaft portion 23 has an upwardly inclined longitudinally disposed extension in the nature of an arm 25, and to the end of this arm is secured the door 26 that is designed to close the opening in the outer end of the hall or passageway.

The hall or passageway has upon its outer wall 27, above its bottom or floor 28 a reticulated bait box 29. Below the bait box, and hingedly secured to the outer wall 27 of the hallway are the main and auxiliary platforms 30 and 31 respectively. These platforms are of a width approximately equaling that of the hallway and are of a length also approximately equaling that of the hallway. The upper faces of the platforms are arranged normally flush with each other, and the auxiliary platform 31 is disposed next to the entrance opening 32 of the hallway and is of a materially less length than that of the main platform.

Secured to the inner wall of the hallway, at the upper portion thereof is a flat spring member 33. This spring, adjacent to its lower portion is provided with an outstanding lug 34 on which the free end of the auxiliary platform normally rests and consequently is retained in its normal substantially horizontal position. Below the lug the spring 33 is rounded upon itself to provide what we will term a tongue 35. The main platform, at the front end thereof is provided with an outwardly extending plate in the nature of a finger 36 that is disposed in the path of engagement with the tongue 35 of the spring 33 and that is designed, when the main platform is lowered, to contact with the said tongue and bring the lug 34 of the spring 33 out of engagement with the auxiliary platform, whereby to permit of the said platform being swung downwardly. In a like manner the finger, being arranged below the auxiliary platform will swing the platform upwardly when the main platform is moved in an upward direction by the weight of the door between the hallway and the cage, and by a construction and arrangement of elements which will now be described. Connected to an eye 37 on the upper face of the main platform 30 is the looped end 38 of a vertically disposed rod 39. This rod passes through an opening 40 in the closed top of the hallway and has its outer end bent angularly as at 41 to engage in one of a series of openings 42 in an upwardly extending angularly disposed plate 43 that is secured to the arm 22.

As stated, the door for the hallway is normally open and is held in such position by the weighted and normally closed door for the opening between the hallway and the cage. An animal, attracted by the bait in the hallway will first tread on the auxiliary platform, which being engaged by the lug 34 of the spring 33 is held against downward swinging. The bait box is arranged a considerable distance to the rear of the auxiliary platform, and the animal, to obtain the bait steps from the auxiliary platform onto the main platform. The weight of the animal causes the downward swinging of the main platform, as well as releasing the auxiliary platform from its engagement by the lug of the spring. The downward swinging of the platform pulls the rod 39 downwardly, and by virtue of the connection of the rod with the angle finger on the arm 22, the said arm and the branches thereof will be swung on the shaft 23, thus swinging the door 26 downwardly to close the door opening 32 of the hallway and likewise elevating the door 19 to uncover the opening between the hallway and the cage. The light in the reticulated cage attracts the animal which will enter the cage, and as soon as the main platform is relieved of the weight of the animal, the weighted door 19, through the medium of the connections therewith and the main platform, will swing the main platform to its normal elevated position, and the finger on the main platform, contacting with the under face of the auxiliary platform will likewise swing the auxiliary platform to its initial position.

The outer face of the lug 34 is preferably beveled as at 44, and the auxiliary platform, when the same is constructed of wood may be notched to receive the spring 33, and over the notch may be arranged a metallic plate 45 that engages with the lug 34 of the spring 33.

It is believed, from the foregoing description, when taken in connection with the drawings, that the construction of the trap and the operation thereof will be apparent without further detailed description.

Having thus described the invention, what is claimed as new, is:—

1. An animal trap including a reticulated cage and a box-like passageway having an open end connected to one side of the cage and having an opening communicating with the cage, a weighted door normally closing the opening, a door for the open end of the passageway, pivotally connected means between the doors whereby the weighted door normally retains the door of the passageway in an open position, two horizontally disposed platforms hingedly connected to one of the sides of the passageway, a rod connection between the inner platform and the connecting means for the doors, whereby said platform is normally retained elevated, means upon the first mentioned platform engaging with the under face of the second platform, and spring catch means normally retaining the second and outer platform elevated with the first mentioned platform, and said means on the first mentioned platform designed to actuate said spring catch means to release the outer platform therefrom when a weight is deposited on the first mentioned platform, and the depression of the first mentioned platform designed to swing the door of the passageway to a closed position and the door between the passageway and the cage to an open position.

2. An animal trap including a reticulated cage and a box-like passageway having an open end connected to one side of the cage and having an opening communicating with the cage, a weighted door normally closing the opening, a door for the outer end of the passageway, means pivotally secured to the top of the passageway and connecting the doors whereby the door of the passageway is normally retained in an open position by the weight of the door between the passageway and cage, a bait box in the passageway, a main and an auxiliary platform having one of their edges hingedly connected to the outer side of the passageway, a rod connection between the inner and main platform and the connecting means between the doors whereby the weighted door normally retains the platform elevated and also whereby when a weight is imposed on the main platform the connecting means between the doors will be swung on its pivot to bring the normally closed door to an open position and the normally open door to a closed position, a spring having a lug thereon engaging with the auxiliary platform for normally retaining the same elevated, said spring below the lug having a curved portion providing a tongue, and a finger on the main platform projecting therefrom and disposed in the path of contact with the tongue, whereby to move the spring to a position to bring the lug thereof out of engagement with the auxiliary platform when the main platform is lowered.

In testimony whereof we affix our signatures.

HARRY W. CLIFTON.
GEORGE CLIFTON.